(12) United States Patent
Hedrick et al.

(10) Patent No.: US 9,221,550 B2
(45) Date of Patent: Dec. 29, 2015

(54) COMPOSITE NORMALIZED ANGLE OF ATTACK INDICATING SYSTEM

(71) Applicants: Geoffrey S. M. Hedrick, Malvern, PA (US); Shahram Askarpour, Media, PA (US)

(72) Inventors: Geoffrey S. M. Hedrick, Malvern, PA (US); Shahram Askarpour, Media, PA (US)

(*) Notice: Subject to any disclaimer, the term of this patent is extended or adjusted under 35 U.S.C. 154(b) by 277 days.

(21) Appl. No.: 13/796,920

(22) Filed: Mar. 12, 2013

(65) Prior Publication Data

US 2014/0266808 A1    Sep. 18, 2014

(51) Int. Cl.
| | |
|---|---|
| *G01C 21/00* | (2006.01) |
| *B64D 45/00* | (2006.01) |
| *B64D 43/02* | (2006.01) |
| *G01P 13/02* | (2006.01) |

(52) U.S. Cl.
CPC .............. *B64D 45/00* (2013.01); *B64D 43/02* (2013.01); *G01P 13/025* (2013.01)

(58) Field of Classification Search
CPC ........... B64D 43/02; B64D 2700/6228; B64D 45/00; B64D 2700/62298; G01D 5/16; G01D 13/025; G01C 23/00; G01C 23/005; G06G 7/70; G01S 19/53
USPC ................. 340/945, 974, 975, 980; 701/4, 6; 33/328; 73/1.78, 180, 488
See application file for complete search history.

(56) References Cited

U.S. PATENT DOCUMENTS

| | | | | |
|---|---|---|---|---|
| 3,587,311 | A | * | 6/1971 | Hays, Jr. .......................... 73/180 |
| 3,686,936 | A | * | 8/1972 | Daudt, Jr. ........................ 73/180 |
| 4,040,005 | A | * | 8/1977 | Melvin ......................... 340/973 |
| 4,235,104 | A | * | 11/1980 | Hoadley et al. ................. 73/180 |
| 4,909,077 | A | * | 3/1990 | Greene ........................... 73/180 |
| 5,595,357 | A | * | 1/1997 | Catlin et al. .................. 244/1 R |
| 6,131,055 | A | * | 10/2000 | Patrick ............................. 701/6 |
| 6,271,769 | B1 | | 8/2001 | Frantz |
| 8,132,117 | B2 | | 3/2012 | Hedrick |
| 2011/0001636 | A1 | | 1/2011 | Hedrick |

FOREIGN PATENT DOCUMENTS

EP      2778070 A1    9/2014

OTHER PUBLICATIONS

European Search Report for application No. EP 13 19 3791, dated Jul. 3, 2014.

* cited by examiner

*Primary Examiner* — Travis Hunnings
(74) *Attorney, Agent, or Firm* — Bryan Cave LLP

(57) ABSTRACT

A composite normalized angle of attack indicating system provides a simultaneous display of both body angle of attack, such as in digital form, and normalized angle of attack for an aircraft. The display may be visually enhanced as stall is approached such as by zooming the body angle of attack digital display and/or by changing the color of the display. The normalized display also selectively displays an approach reference band when the flap setting is equal to or greater than 20 degrees.

21 Claims, 3 Drawing Sheets

COMPOSITE NORMALIZED ANGLE OF ATTACK INDICATING SYSTEM

FIELD OF THE INVENTION

The present invention relates to aircraft instrumentation for aircraft and particularly to angle of attack indicating systems. More particularly, the present invention relates to normalized angle of attack indicating systems.

BACKGROUND OF THE INVENTION

Angle of attack, or AOA, which is the angle at which the air hits the wing of an aircraft, or the angle α between the airfoil's reference line and the oncoming air flow, is an important and useful concept in controlling an aircraft's critical performance. For example, a stall occurs at a particular angle of attack; the smallest power-off descent rate occurs at a particular angle of attack; the best power-off glide ratio occurs at a particular angle of attack; the recommended approach speed is related to the angle of attack; the best rate of climb occurs at a particular angle of attack; and the best angle of climb occurs at a particular angle of attack.

The so called critical angle of attack is the angle of attack which produces the maximum lift coefficient and is also known as the stall angle of attack. Below the critical angle of attack, as the angle of attack increases, the coefficient of lift increases, while above the critical angle of attack, as the angle of attack increases, the air begins to flow less smoothly over the upper surface of the airfoil and begins to separate from the upper surface. Above this critical angle of attack, the aircraft is said to be in a stall. The airspeed at which the aircraft stalls normally varies with various parameters associated with the aircraft itself, such as the weight of the aircraft, the load factor, the center of gravity and other factors; however, the aircraft always stalls at the same critical angle of attack.

Because of the critical nature of angle of attack in flying the aircraft, particularly in commercial aircraft, various types of instrumentation have been developed over the years to indicate to the pilot what the angle of attack of the aircraft is at various critical points along the flight path of the aircraft above, below, and at the critical angle of attack. This instrumentation has generally fallen into two categories, namely non-normalized body angle of attack indicators, such as disclosed in U.S. Pat. No. 6,131,055, and normalized angle of attack indicators, such as disclosed in U.S. Pat. No. 6,271,769, with each type of system having its own benefits and drawbacks. For example, indicating systems employing non-normalized body angle of attack, a key component of the angle of attack gauge, approach angle of attack, slides up and down a scale based on flap position rather then being at a more readily discernible fixed location, whereas indicating systems employing normalized angle of attack, variations in Mach number can potentially result in misleading readings. Since one key purpose of these angle of attack indicating systems is to provide flight crews with so called quick glance awareness to the proximity of an unsafe operating speed, the presence of either of these disadvantages at a critical time is highly undesirable.

These disadvantages are overcome by the present invention which provides a composite display of both the body angle of attack in a readily discernible digital display adjacent the normalized angle of attack display, thereby retaining the benefits of a body angle of attack gauge while still providing the simplicity of a normalized angle of attack gauge with fixed key reference points.

SUMMARY OF PARTICULAR EMBODIMENTS OF THE INVENTION

The present invention comprises a normalized angle of attack indicating system for an aircraft in which a display gauge includes fixed position markings to indicate a predetermined range of normalized angle of attack provided in a normalized display presentation, and a displayable indicia, such as a digital presentation, of body angle of attack displayed simultaneously with the normalized angle of attack display presentation for simultaneously providing a composite display of both normalized angle of attack and body angle of attack for the aircraft on the display gauge. The predetermined range of the normalized display presentation is preferably between a zero body angle of attack and a stall angle of attack for the aircraft. The display also preferably includes a selective display of approach reference angle of attack in the normalized display presentation when the fixed position markings correspond to a predetermined percentage of the stall angle of attack.

The normalized angle of attack display presentation preferably includes a scale having a plurality of scale segments, such as a typical flight area segment, a stick shaker angle of attack segment, and an approach angle of attack segment. It may also include scale segments based on the zero body angle of attack and the stall angle of attack. In addition, the system preferably includes means for enhancing the display presentation, such as by zooming the body angle of attack display and/or changing its coloration, such as to red, when the body angle of attack approaches the stall value for the aircraft.

DETAILED DESCRIPTION OF EMBODIMENTS OF THE INVENTION

Figure 1:
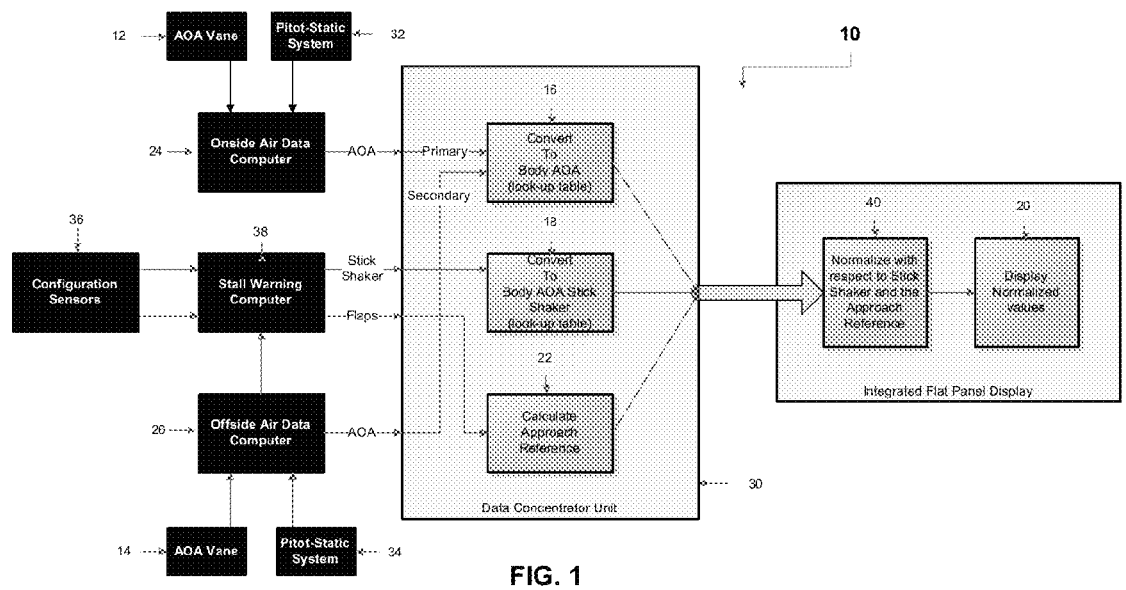
FIG. 1 is a block diagram of the presently preferred embodiment of the normalized angle of attack indicating system of the present invention.
Figure 2:
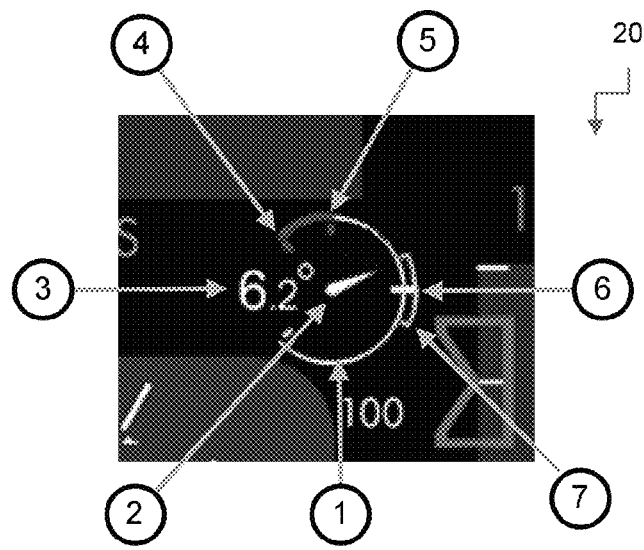
FIG. 2 is a diagrammatic illustration of a typical display gauge presentation for the normalized angle of attack indicating system of FIG. 1.
Figure 3:
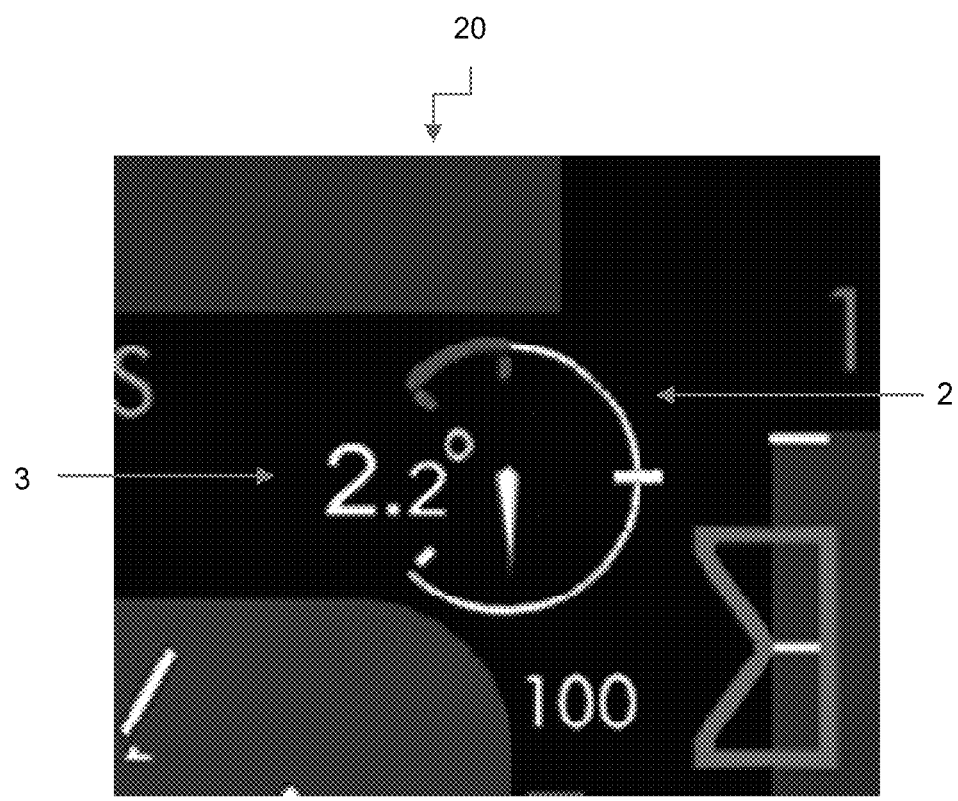
FIG. 3 is a diagrammatic illustration of the display gauge of FIG. 2 enroute for the aircraft.
Figure 4:
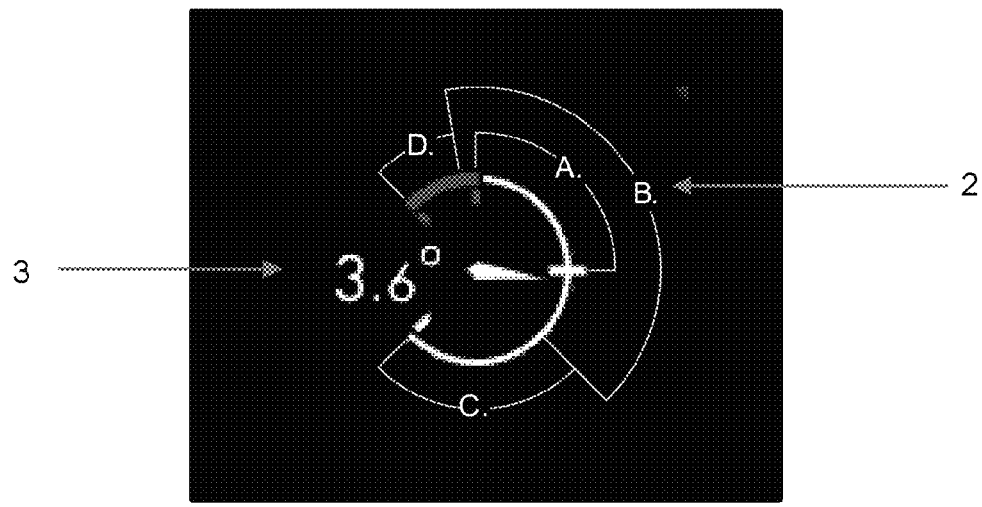
FIG. 4 is a diagrammatic illustration of the display gauge of FIG. 2 illustrating the normalized scale points of reference.

Referring now to the drawings in detail, and initially to FIG. 1, a block diagram of the presently preferred angle of attack indicating system 10 in accordance with the present invention is shown. As will be noted, the indicating system 10 of the present invention preferably provides a composite display 20, such as illustrated in FIGS. 2-4, of both the body angle of attack 3, in a digital display, and the normalized angle of attack 2. As shown and preferred in FIG. 1, the normalized angle of attack is calculated in a similar fashion to the body angle of attack. The conventional Vane angle of attack, or AOA Vane, 12, 14 is provided to the conventional on board left, center and right data concentrator units 16, 18, 22, respectively, via the conventional onside air data computer 24, and offside air data computer 26, respectively. This Vane AOA is typically raw angle of attack data. The particular aircraft type is preferably conventionally determined based on the pin strapping of the data concentrator unit 30. As further shown in FIG. 1, a conventional pitot static system 32, 34 monitors and sends both a static pressure signal and a total pressure signal to the respective air data computers 24, 26. The air data computers 24, 26 then conventionally send the aircraft's actual angle of attack signal to the data concentrator unit 30. In addition, conventional configuration sensors 36 on the aircraft communicate various relevant values to a conventional stall warning computer 38, such as stick shaker and flaps, which are in turn communicated to the data concentrator unit 30.

As further shown and preferred in FIG. 1, the stick shaker signal is fed to the center data concentrator 18 where it is conventionally converted to a body angle of attack stick shaker value using a look up table, and is, in turn, fed to the composite display 20 which is preferably normalized with respect to stick shaker, as represented in FIG. 1 by block 40. In addition, the flaps output of the stall warning computer 38 output is fed to data concentrator 22 where the approach reference is conventionally calculated and also normalized with respect to the approach reference as also indicated in FIG. 1 at block 40. Both of these normalized values are communicated to the composite display 20 for providing a normalized display presentation thereof. In addition, as also shown and preferred in FIG. 1, the AOA outputs of both of the air data computers 24, 26 are preferably fed to data concentrator unit 16 where they are conventionally converted to a corresponding body angle of attack using a look up table and converted into a digital display of the body angle of attack for display on the composite display 20 alongside the normalized display presentation, such as illustrated in FIGS. 2-4. If desired, the body angle of attack component of the composite display 20, which is non-normalized, may be conventionally calculated in the manner described in U.S. Pat. No. 6,131,055, the contents of which are hereby specifically incorporated by reference herein in its entirety. In either instance, the calculated body angle of attack is converted into a digital display 3 which preferably appears in the composite display 20 adjacent the normalized angle of attack display presentation 1, 2 (see FIG. 2).

Preferably, the normalized points of reference for the normalized display presentation in the preferred composite display 20 are determined from the body angle of attack in accordance with the following equation $$n = \frac{\alpha - \alpha_{APP}}{\alpha_{SS} - \alpha_{APP}} * -90$$

"where $\alpha$ represents the angle of attack
$\alpha_{App}$ represents the approach reference angle of attack
And $\alpha_{ss}$ represents the stick shaker angle of attack"

Referring now to FIG. 2, a typical composite display gauge presentation for the normalized angle of attack indicating system 10 of FIG. 1 is shown. As shown and preferred, the normalized display gauge 20, includes a normalized AOA gauge 1 which represents normalized AOA from 0.0 to 1.0 where 1.0 represents the stall angle of attack, 0.875 represents the stick shaker angle of attack, 0.60 represents the ideal approach AOA for flap handle positions less than 20 degrees, and 0.0 represents the zero point reference which equals 0 degrees body angle of attack. As further shown, the normalized display gauge presentation includes a movable pointer 2 for providing the normalized AOA indication on the composite display 20, with the Vane AOA being converted to body AOA and being normalized between stick shaker AOA and the zero point reference in the composite display 20. In addition, as further shown and described, the composite display 20 also includes the previously mentioned digital indication 3 of the body AOA which, as previously described, is preferably a result of the Vane AOA being received from the air data computer 24, 26 or stall warning computer 38 and converted to body AOA based on the aircraft type. The stall AOA, which represents 1.0 on the scale normalized gauge 1, is represented by reference numeral 4 in FIG. 2 in the composite display 20 and is a calculated value based on the stick shaker AOA. Reference numeral 5 in FIG. 2 represents the normalized stick shaker AOA in the composite display 20. Reference numeral 6 in FIG. 2 represents the ideal AOA reference for approach in the composite display 20, as will be described hereinafter, and is preferably utilized in the normalization calculation only on approach. Preferably, the ideal AOA reference for approach, when displayed, is shown at the 0.6 tick mark in the composite display 20. In addition, the composite display 20 also selectively displays an approach reference band 7 only when, by way of example, the flap handle setting is set to equal or greater than 20 degrees. Preferably, the approach reference band 7 displayed in the composite display 20 is based on an internally stored table which conventionally varies with flap setting, received via the stall warning computer 38, and aircraft type. The resulting value is then normalized and centered in the composite display 20 at the 0.6 tick mark when, preferably, the flap setting is 20 degrees or higher.

Referring now to FIG. 3, a normalized display 20 similar to FIG. 2 is shown. However, as will be noted, no approach reference band 7 is present in the composite display 20 as the aircraft is shown enroute and is not on approach so that the flap handle setting, received via the stall warning computer 38, is set to less than 20 degrees for the aircraft.

Referring now to FIG. 4, a normalized display 20 similar to FIGS. 2 and 3 is shown. As illustrated in FIG. 4, the normalized scale 1 is preferably effectively segmented as it is scaled from zero body AOA up to stall AOA. The four "segments" of the normalized scale 1 in the indicating system 10 of the present invention are diagrammatically illustrated in FIG. 4 by scale portions A, B, C, and D. Scale portion A represents the stick shaker AOA and the approach reference AOA, or 60 percent of stall AOA, depending on the phase of flight of the aircraft, and are utilized in the present invention as references to create the normalized scale 1 based on the above normalization equation for determining the value of n. Scale portion B represents the typical flight area for the aircraft. Generally, on approach, the approach reference AOA ranges in percentage of stall from 25 percent to 40 percent. Therefore, the scaling exhibited in scale portion A is carried through on scale portion B, allowing the needle or pointer 2 to move linerally within the typical flight area. Scale portions C and D are preferably calculated based on either the zero body AOA or the stall AOA compared to the resulting end points from scale portion B.

Figure 5:
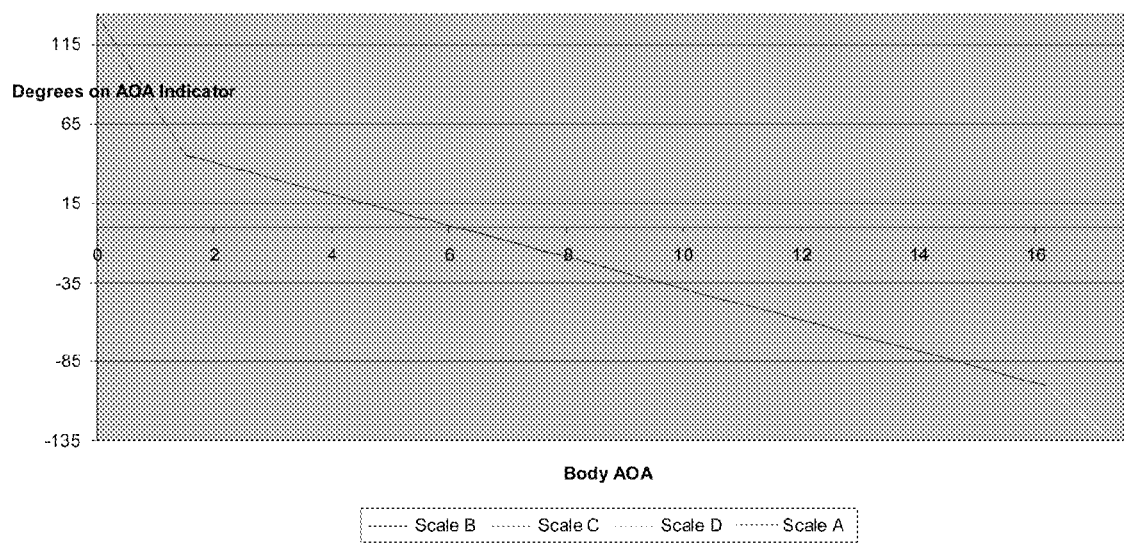
FIG. 5 is a graphical representation illustrating the body angle of attack to the normalized angle of attack on approach for a flap setting of 20.

FIG. 5 is a graphic illustration of a typical body AOA to degrees on the normalized AOA indicator 10 of the present invention, with the approach flaps set at 20 degrees.

In accordance with the present invention, the indicating system 10 of the present invention also preferably provides an additional visual warning to the flight crew when the aircraft is at or near stall by preferably zooming the body angle digital display as well as changing its color, such as by making it red, preferably along with making the needle 2 red as well. This visual warning can be separate from or in addition to other warnings, such as an audio warning when the aircraft is close to stall.

Thus, in the indicating system 10 of the present invention, the calculated body AOA is digitally displayed adjacent the normalized AOA scale presentation, with the calculated body AOA being normalized based on stick shaker AOA and approach reference AOA. By displaying the body AOA in a composite display 20 with the normalized AOA provides the flight crew with the best of both worlds to provide flight crews with an accurate and efficient quick glance awareness to the proximity of an unsafe operating speed for the aircraft which overcomes the disadvantages of the prior art.

What is claimed is:

1. A normalized angle of attack indicating system for use in an aircraft comprising:
a display gauge having fixed position markings to indicate a predetermined range of normalized aircraft angle of attack in a normalized display presentation, said predetermined range comprising a zero body angle of attack and a stall angle of attack with respect to said aircraft, said display gauge comprising means for displaying said predetermined range in said normalized display presentation;
means for selectively displaying an approach reference band for said aircraft in said normalized display presentation when said fixed position markings correspond to a predetermined percentage of said stall angle of attack; and
means for displaying a displayable indicia of body angle of attack for said aircraft simultaneously with said normalized angle of attack for said aircraft on said display gauge for providing a composite simultaneous display of said body angle of attack along with said normalized angle of attack for said aircraft, said body angle of attack being dependent on specific constants for said aircraft.

2. An indicating system in accordance with claim 1 wherein said body angle of attack displayable indicia comprises a digital display of said body angle of attack.

3. An indicating system in accordance with claim 2 wherein said normalized angle of attack display presentation comprises a movable pointer indicia and a scale comprising said fixed position markings, said pointer indicia being movable along said scale between said fixed position markings in accordance with changes in said normalized angle of attack.

4. An indicating system in accordance with claim 3 wherein said scale comprises a plurality of scale segments, said scale segments comprising a typical flight area segment, a stick shaker angle of attack segment, and an approach angle of attack segment.

5. An indicating system in accordance with claim 4 wherein said scale segments further comprise a scale segment based on said zero body angle of attack and a scale segment based on said stall angle of attack.

6. An indicating system in accordance with claim 5 further comprising means for enhancing said body angle of attack display presentation in response to a predetermined condition.

7. An indicating system in accordance with claim 6 wherein said predetermined condition comprises said body angle of attack value approaching said stall value for said aircraft.

8. An indicating system in accordance with claim 7 wherein said enhancing means further comprises means for dynamically zooming said body angle of attack display presentation in response to said predetermined condition.

9. An indicating system in accordance with claim 8 wherein said enhancing means further comprises means for changing coloration of said body angle of attack display presentation in response to said predetermined condition.

10. An indicating system in accordance with claim 9 wherein said normalized scale is based on the equation $$n = \frac{\alpha - \alpha_{APP}}{\alpha_{SS} - \alpha_{APP}} * -90$$

where $\alpha$ represents the angle of attack
$\alpha_{App}$ represents the approach reference angle of attack,
and $\alpha_{ss}$ represents the stick shaker angle of attack.

11. An indicating system in accordance with claim 1 wherein said body angle of attack displayable indicia comprises a digital display of said body angle of attack.

12. An indicating system in accordance with claim 11 wherein said normalized angle of attack display presentation comprises a movable pointer indicia and a scale comprising said fixed position markings, said pointer indicia being movable along said scale between said fixed position markings in accordance with changes in said normalized angle of attack.

13. An indicating system in accordance with claim 1 wherein said normalized angle of attack display presentation comprises a movable pointer indicia and a scale comprising said fixed position markings, said pointer indicia being movable along said scale between said fixed position markings in accordance with changes in said normalized angle of attack.

14. An indicating system in accordance with claim 13 wherein said scale comprises a plurality of scale segments, said scale segments comprising a typical flight area segment, a stick shaker angle of attack segment, and an approach angle of attack segment.

15. An indicating system in accordance with claim 14 wherein said scale segments further comprise a scale segment based on said zero body angle of attack and a scale segment based on said stall angle of attack.

16. An indicating system in accordance with claim 1 further comprising means for enhancing said body angle of attack display presentation in response to a predetermined condition.

17. An indicating system in accordance with claim 16 wherein said predetermined condition comprises said body angle of attack value approaching said stall value for said aircraft.

18. An indicating system in accordance with claim 17 wherein said enhancing means further comprises means for dynamically zooming said body angle of attack display presentation in response to said predetermined condition.

19. An indicating system in accordance with claim 18 wherein said enhancing means further comprises means for changing coloration of said body angle of attack display presentation in response to said predetermined condition.

20. An indicating system in accordance with claim 17 wherein said enhancing means further comprises means for changing coloration of said body angle of attack display presentation in response to said predetermined condition.

21. An indicating system in accordance with claim 1 wherein said normalized angle of attack display presentation comprises a scale comprising said fixed position markings, said normalized scale being based on the equation $$n = \frac{\alpha - \alpha_{APP}}{\alpha_{SS} - \alpha_{APP}} * -90$$

where $\alpha$ represents the angle of attack
$\alpha_{App}$ represents the approach reference angle of attack,
and $\alpha_{ss}$ represents the stick shaker angle of attack.

* * * * *